(12) United States Patent
Ernst et al.

(10) Patent No.: US 8,114,226 B2
(45) Date of Patent: Feb. 14, 2012

(54) WALL MOUNTABLE HOLDER

(75) Inventors: Richard J. Ernst, San Diego, CA (US); John P. Grimm, Santee, CA (US)

(73) Assignee: Illinois Tool Works Inc., Glenview, IL (US)

( * ) Notice: Subject to any disclaimer, the term of this patent is extended or adjusted under 35 U.S.C. 154(b) by 464 days.

(21) Appl. No.: 12/370,347

(22) Filed: Feb. 12, 2009

(65) Prior Publication Data

US 2009/0229713 A1    Sep. 17, 2009

Related U.S. Application Data

(63) Continuation-in-part of application No. 12/049,182, filed on Mar. 14, 2008.

(51) Int. Cl.
*C21D 1/42* (2006.01)

(52) U.S. Cl. ............... 148/567; 148/575; 148/639

(58) Field of Classification Search .......... None
See application file for complete search history.

(56) References Cited

U.S. PATENT DOCUMENTS

| | | |
|---|---|---|
| 328,851 A | 10/1885 | Lane |
| 448,224 A | 3/1891 | Glover |
| 856,302 A | 6/1907 | Rosenberg et al. |
| 1,057,448 A | 4/1913 | Nordstrom |
| 1,384,583 A | 7/1921 | Wood |
| 1,491,203 A | 4/1924 | Enoch |
| 2,222,831 A | 11/1940 | Bitney |
| 2,797,059 A | 6/1957 | Uhrin |
| 2,877,971 A | 3/1959 | Goldstein |
| 2,883,720 A | 4/1959 | Hansen |
| 3,227,386 A | 1/1966 | Pitcher |
| 3,641,866 A | 2/1972 | Mortensen |
| D242,407 S | 11/1976 | Enckler |
| 4,101,107 A | 7/1978 | Antoszewski |
| 4,441,619 A | 4/1984 | Gibitz |
| 4,589,935 A * | 5/1986 | Scott .............. 148/573 |
| 4,601,625 A | 7/1986 | Ernst et al. |
| 4,763,456 A | 8/1988 | Giannuzzi |

(Continued)

FOREIGN PATENT DOCUMENTS

DE    040 16 724    11/1991

(Continued)

OTHER PUBLICATIONS

International Searching Authority (ISA), European Patent Office mailed PCT International Search Report for PCT/US2010/021969 on Apr. 29, 2010, 4 pages.

(Continued)

*Primary Examiner* — George Wyszomierski
(74) *Attorney, Agent, or Firm* — Mark W. Croll; Patricia M. Chidiac; Beem Patent Law Firm (57) ABSTRACT

A holder having a baseplate with a tang extending rearwardly therefrom, a plurality of openings for receiving fasteners and a plurality of legs extending from the baseplate, the tang being heat treated or work hardened to harden the tang and facilitate its detachment for non-friable substrate applications. Work hardening may be accomplished, for example, by heating and quenching the tang to increase both its hardness and its brittleness to a level that allows the tang to be broken off with an impact force but not when inserted into a friable substrate so that the holder retains greater functionality.

9 Claims, 6 Drawing Sheets

U.S. PATENT DOCUMENTS

| | | | |
|---|---|---|---|
| 4,892,429 A | 1/1990 | Giannuzzi | |
| 5,007,609 A | 4/1991 | Bredovskis | |
| 5,039,262 A | 8/1991 | Giannuzzi | |
| 5,160,225 A | 11/1992 | Chern | |
| 5,173,133 A * | 12/1992 | Morin et al. | 148/567 |
| 5,190,425 A | 3/1993 | Wieder et al. | |
| 5,234,299 A | 8/1993 | Giannuzzi | |
| 5,308,203 A | 5/1994 | McSherry et al. | |
| 5,449,257 A | 9/1995 | Giannuzzi | |
| 5,482,418 A | 1/1996 | Giannuzzi | |
| 5,529,449 A | 6/1996 | McSherry et al. | |
| 5,536,121 A | 7/1996 | McSherry | |
| 5,558,479 A | 9/1996 | McElderry | |
| 5,625,994 A | 5/1997 | Giannuzzi | |
| 5,692,864 A | 12/1997 | Powell et al. | |
| 5,752,792 A | 5/1998 | McSherry | |
| 5,833,415 A | 11/1998 | McSherry | |
| 5,882,162 A | 3/1999 | Kaneko | |
| 5,944,295 A | 8/1999 | McSherry | |
| 5,991,998 A | 11/1999 | Kaneko | |
| 6,079,921 A | 6/2000 | Gauthier et al. | |
| 6,139,236 A | 10/2000 | Ito | |
| 6,186,716 B1 | 2/2001 | West et al. | |
| 6,196,780 B1 | 3/2001 | Wakai et al. | |
| 6,250,865 B1 | 6/2001 | McSherry | |
| 6,273,974 B1 * | 8/2001 | Lat et al. | 148/639 |
| 6,299,001 B1 | 10/2001 | Frolov et al. | |
| 6,354,779 B1 | 3/2002 | West et al. | |
| 6,382,892 B1 | 5/2002 | Hempfling | |
| 6,419,436 B1 | 7/2002 | Gaudron | |
| 6,485,055 B1 | 11/2002 | Swayne et al. | |
| 6,676,350 B1 | 1/2004 | McSherry et al. | |
| 6,830,228 B2 | 12/2004 | Ernst | |
| 7,427,053 B2 | 9/2008 | Nawrocki | |
| 2001/0047972 A1 | 12/2001 | Plutsky | |
| 2002/0088911 A1 | 7/2002 | Kao | |
| 2002/0113183 A1 | 8/2002 | Mattesky | |
| 2004/0124164 A1 | 7/2004 | Perkins | |
| 2004/0159766 A1 | 8/2004 | Skorka | |
| 2005/0079027 A1 | 4/2005 | Ernst et al. | |
| 2005/0084360 A1 | 4/2005 | Panasik et al. | |
| 2006/0024144 A1 | 2/2006 | Horvath | |
| 2006/0186306 A1 | 8/2006 | Castle | |
| 2007/0114348 A1 | 5/2007 | Nawrocki | |

FOREIGN PATENT DOCUMENTS

| | | |
|---|---|---|
| DE | 94 20 041 U1 | 3/1995 |
| DE | 295 02 052 U | 3/1995 |
| DE | 295 09 487 U | 3/1995 |
| DE | 197 53 230 A1 | 6/1996 |
| DE | 093 01 098 | 1/1997 |
| DE | 297 05 126 U1 | 5/1997 |
| DE | 19 852 339 | 5/2000 |
| EP | 0 951 869 | 10/1999 |
| EP | 0 965 767 | 12/1999 |
| EP | 1 004 781 | 5/2000 |
| EP | 1 298 331 A | 2/2003 |
| EP | 1 522 744 | 4/2005 |
| FR | 439 431 ET 439 432 | 9/1996 |
| GB | 1 487 032 | 7/1975 |
| GB | 2 357 130 A | 6/2001 |
| JP | 02005121224 | 5/2005 |
| WO | WO/99/05420 | 2/1999 |
| WO | WO/2004/053341 | 6/2004 |
| WO | WO/2004/079209 | 9/2004 |
| WO | WO/2004/079210 | 9/2004 |
| WO | WO/2005/038275 | 4/2005 |
| WO | WO/2006/031421 | 3/2006 |
| WO | 2006135558 A | 12/2006 |
| WO | WO/2006/013558 | 12/2006 |

OTHER PUBLICATIONS

International Searching Authority (ISA), European Patent Office mailed PCT International Search Report for PCT/US 2006/020692 on Sep. 6, 2006, 4 pages.

International Searching Authority (ISA), European Patent Office mailed PCT International Search Report for PCT/US 2006/020693 on Oct. 24, 2006, 5 pages.

\* cited by examiner

WALL MOUNTABLE HOLDER

This application is a continuation-in-part of U.S. patent application Ser. No. 12/049,182, filed Mar. 14, 2008.

BACKGROUND OF THE INVENTION

1. Field of the Invention

The present invention is directed to a wall mountable holder, commonly a garage hook, mountable in a friable substrate such as drywall, for holding an object such as a household or garden item, e.g., a tool such as a spade.

2. Description of the Related Art

Garage hooks typically are wire-like with a drywall penetrating end that is straight, pointed, and typically threaded like a screw for driving into drywall and sometimes a stud. An opposite end usually forms one of a variety of configurations of hooks. Driving the garage hook commonly is accomplished by gripping and turning the hook end to drive the point and the threads into the drywall.

Anyone who has attempted to install wire-like garage hooks knows that it is easier said than done. A firm, steady, axial, pushing-while-rotating force is needed, and driving typically is stuttered and wobbly. If the user hits a stud squarely, great effort and skill are required to force the point and the threads into the stud, which may cause the threads to strip out the soft, friable drywall, often resulting in an unsightly and uncertain installation. More commonly, the user does not hit a stud, and the installation may look sound but is actually wobbly and loose. Moreover, screw-like threads have little pullout strength in drywall alone and can easily strip out the drywall during installation. In use, the garage hook may turn, particularly after repeated loading, unloading and bumps, causing the garage hook to loosen, fall or dump its load from the wall, resulting in damage to the load, the wall, or other garaged property, such as a car.

For additional pullout strength, some garage hooks, see, e.g., U.S. Pat. No. 6,676,350 to McSherry, rely on large drywall-anchor-like threads. Such garage hooks sometimes require pre-drilling and are often defeated if they hit a stud. Although garage hooks with drywall threads provide higher pullout strength in drywall than screw-like threads, they still usually can only hold objects of light to moderate weight.

Pre-drilling into studs or wood may be considered for many kinds of garage hooks, however, in each case, additional planning, tools and time are required. For example, some garage hooks require one or more screws to be driven, but unless pilot holes are positioned, sized and pre-drilled with great care, efforts to drive screws can result in stripping of the drywall.

Illinois Tool Works Inc., assignee of this application, has made many advances in drywall anchors. An anchor sold under the trademark E-Z ANCOR, see commonly assigned U.S. Pat. No. 4,601,625, is a self-drilling drywall anchor. Another anchor, sold under the trademark STUD SOLVER, see commonly assigned U.S. Patent Application Ser. No. 60/510,708, is a self-drilling drywall anchor capable of penetrating studs. Illinois Tool Works Inc. has made further advances in garage hook technology, including the hooks in the commonly assigned U.S. patent application Ser. No. 11/148,159. These hooks, often made of a unitary structure comprising a base and one or more legs and one or more self-drywall anchors, exhibit high holding strength in dry wall.

What is needed is a holder mountable to a friable substrate that may be easily installed for increased pullout resistance and load capacity.

BRIEF SUMMARY OF THE INVENTION

In one aspect of the invention, a substrate-mountable holder comprising a metal base having a centerline, the base having a plurality of openings to receive a plurality of fasteners; a generally symmetrical wireform having a pair of legs with a portion therebetween, the portion welded to the base, each leg having a first segment extending parallel to the base and a second segment extending outwardly of the base; and a tang projecting from a rear side of the base, the tang having a Rockwell B hardness of between about 90 and about 100 proximate the base. To achieve this Rockwell hardness, the tang may initially be formed of 1010 steel and then heat treated, for example by welding or induction hardening, or it may be work hardened.

In another aspect of the invention, a method for hardening a tang protruding from a rear surface of a holder, the holder comprising a thin metal baseplate having a plurality of openings for receiving a plurality of fasteners, the holder further comprising a generally symmetrical pair of legs, the method comprising heating the tang; and quenching the tang. The method may further comprise forming the tang from the baseplate, for example from a single piece of 1010 steel. To achieve a desired Rockwell B hardness, for example between about 90 and about 100, the tang may be heated to between about 1500° F. and about 1800° F. for between about 3 seconds and about 6 seconds. In addition, quenching may achieved by submersing the tang in water or oil.

These and other features and advantages are evident from the following description of the present invention, with reference to the accompanying drawings.

DETAILED DESCRIPTION

A holder 10 including a metal flange or base plate 26 may have a plurality of openings 30, 31 each capable of receiving fasteners 23, 24 for mounting holder to a variety of substrates. To assist in mounting of holder 10 to friable substrates, holder 10 may have a rearwardly projecting tang 33 that may embed in substrate, locating holder 10 while a user installs fasteners 23 and/or 24. For non-friable substrate applications, tang 33 may be separated from holder 10 leaving a generally planar rear surface for engagement with outer surface 44 of substrate. Tang 33 preferably may be hardened as compared to base plate 26 to facilitate separation, as described in greater detail below.

In one aspect of the invention, a substrate-mountable holder may comprise a metal base having a centerline, the base having a plurality of openings to receive a plurality of fasteners; a generally symmetrical wireform having a pair of legs with a portion therebetween, the portion welded to the base, each leg having a first segment extending parallel to the base and a second segment extending outwardly of the base. Additionally, each of the legs may have an upturned end.

In other aspects of the invention, the first segment of each leg may extend generally parallel to the centerline, or the first segment of each leg may be angled with respect to the centerline.

In further aspects of the invention, the second segment of each leg may extend generally linearly outwardly of the base, or the second segment may have a radius of curvature.

In still further aspects of the invention, the plurality of openings may be configured to receive drywall fasteners each having a crest diameter of at least about ¼ inch, the openings may be generally aligned with the centerline and the weld may be positioned between the plurality of openings, and the holder may have a second plurality of openings to receive a second plurality of fasteners.

In one aspect of the invention, a holder may include at least one self-drilling drywall fastener, a wall-contacting base plate having at least one opening for receiving one said self-drilling drywall fastener, and at least one leg for holding an object. The combination of the self-drilling drywall fastener and the base plate may provide increased pullout resistance and load capacity in a friable substrate. The opening may be sized for engaging a head of the drywall fastener to seat the drywall fastener.

In another aspect of the invention, a holder may include at least one self-drilling drywall fastener having a drilling portion longer than a drywall thickness followed by a high-threaded portion for engaging the friable substrate, a wall contacting base plate having at least one opening for receiving one said self-drilling drywall fastener, and at least one leg for holding an object. In this configuration, the drilling portion may bore a pilot hole entirely through the drywall before the high threads begin to engage the drywall. The high-threaded portion also may be longer than the drywall thickness, so that the high threads may engage the rear drywall surface and add further to the pullout resistance and load capacity.

In still another aspect of the invention, a holder may include at least one self-drilling drywall fastener having a screw-like distal portion longer than a drywall thickness followed by a high-threaded drywall-engaging portion and a head having a recess for receiving a rotary driver, a wall contacting base plate having a pair of openings each capable of receiving one said self-drilling drywall fastener, and at least one leg for holding an object. In this configuration, if a stud is encountered, the screw-like drilling portion may self-drill into the stud. The at least one leg and pair of base plate openings may be aligned for increased pullout resistance and load capacity.

Figure 21:
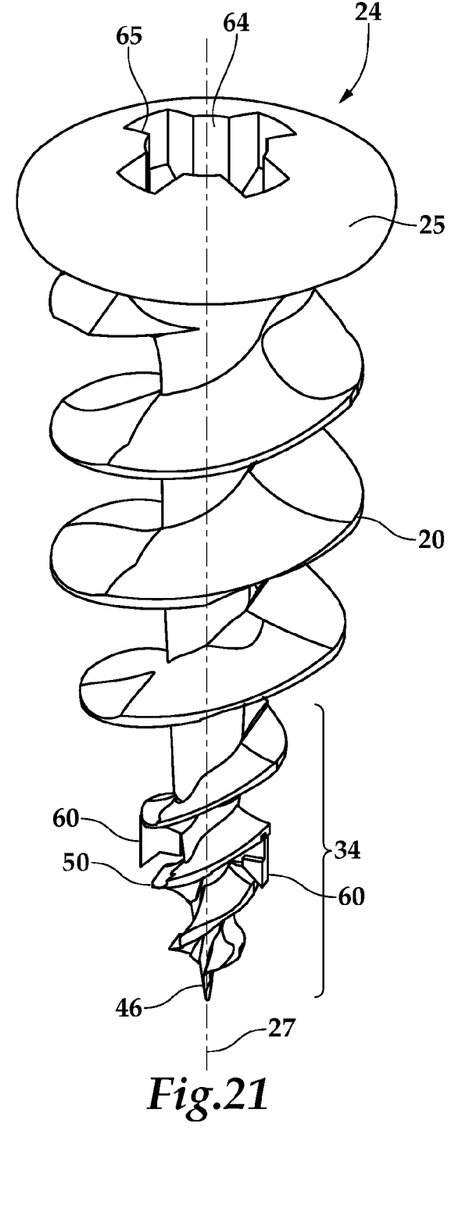
FIG. 21 is a perspective view of a drywall type fastener.
Figure 22:
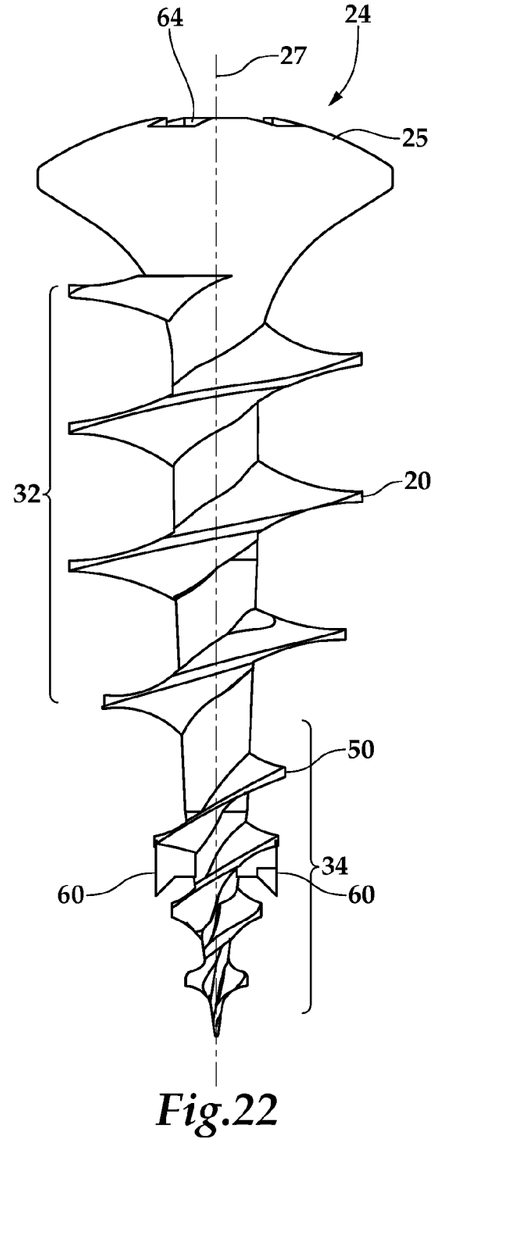
FIG. 22 is elevation view of the drywall type fastener of FIG. 21.

Referring to FIGS. 1-4, a holder 10 includes a flat, generally planar, generally oval or "surfboard-shaped" metal flange or base plate 26 having at least one and, as shown, a pair of openings 30, each capable of receiving an drywall fastener 24 (see FIGS. 21 and 22). Holder 10 may further include a generally symmetrical wireform having a predetermined shape and having a pair of legs 28 with a portion 91 therebetween. At least one and potentially two or more legs 28 extend from base plate 26 to the other side of center (e.g., below) for holding an object. Leg(s) 28 and drywall fasteners 24 spaced to either side of the center of the flange or base plate provide for higher overall pullout resistance and load capacity for holder 10.

Returning to FIGS. 1-4, base plate 24 may be made of sheet metal and may have a thickness between about 10 gauge and about 20 gauge, preferably between about 14 gauge and about 18 gauge, more preferably about 16 gauge. Base plate 24 may be stamped from sheet metal in a generally oval shape that may be between about 2 inches and about 5 inches tall from a top 38 to a bottom 39, preferably between about 3 inches and about 4 inches tall, more preferably about 3 inches tall. Base plate may also be between about 1 inch and about 3 inches wide, preferably between about 1 inch and about 2 inches wide, and in one embodiment, about 1½ inch wide.

Base plate 24 may further have a plurality of first openings 30 and a plurality of second openings 31 stamped out of plate. First openings 30 may be sized to accommodate high-threaded drywall fasteners and may have a diameter between about ¼ inch and about ¾ inch, preferably between about ¼ inch and about ½ inch, and, in one embodiment, about 0.46 inch. Second openings 31 may be sized to accommodate nails, wood fasteners or masonry fasteners and may have a diameter between about ⅛ inch and about ¼ inch, and, in one embodiment, about 0.2 inch. First openings 30 and second openings 31 may be substantially symmetrically formed about center of base plate 24 such that center of first openings may be between about ⅓ inch and about 1 inch from top or bottom of base plate 24, respectively, preferably between about ½ inch and about ¾ inch, still more preferably about ⅝ inch. Center of second openings may be between about 1/16 inch and about ¼ inch from top or bottom of base plate 24, respectively, preferably between ⅛ and about ¼, still more preferably about 3/16 inch.

Holder 10 is mountable to a friable substrate such as drywall and is used for holding, typically hanging, an object (not shown), such as a tool, a ladder, a broom, a spade, a bicycle, or other objects on a friable substrate such as drywall. Holder 10 allows a user to select a position anywhere on drywall that is feasible to place the object desired to be held. Holder 10 may be used for holding tools or other objects on interior or exterior friable substrates of a residential home and is particularly useful for hanging tools or other objects from a wall or ceiling within a garage; therefore, holder 10 will be described and shown as a garage hook. However, holder 10 may be equally usable in other applications.

The friable substrate may be one of several materials used in construction, such as stucco, plaster, or gypsum based drywall sold under the trademark SHEETROCK by United States Gypsum. Drywall typically has a thickness T of about ½ inch or about ⅝ inch, but it may be obtained in other thicknesses, such as about ⅜ inch. Typically, friable substrates such as drywall are mounted to support studs, such as wood support studs, for example 2×4 studs or the like, evenly spaced apart, e.g. every 16 inches, or metal support studs, such as steel support studs. Studs are substantially more resistant to pullout than drywall because they are less friable and much less likely to break apart.

Figures 1, 2, 3, 4:
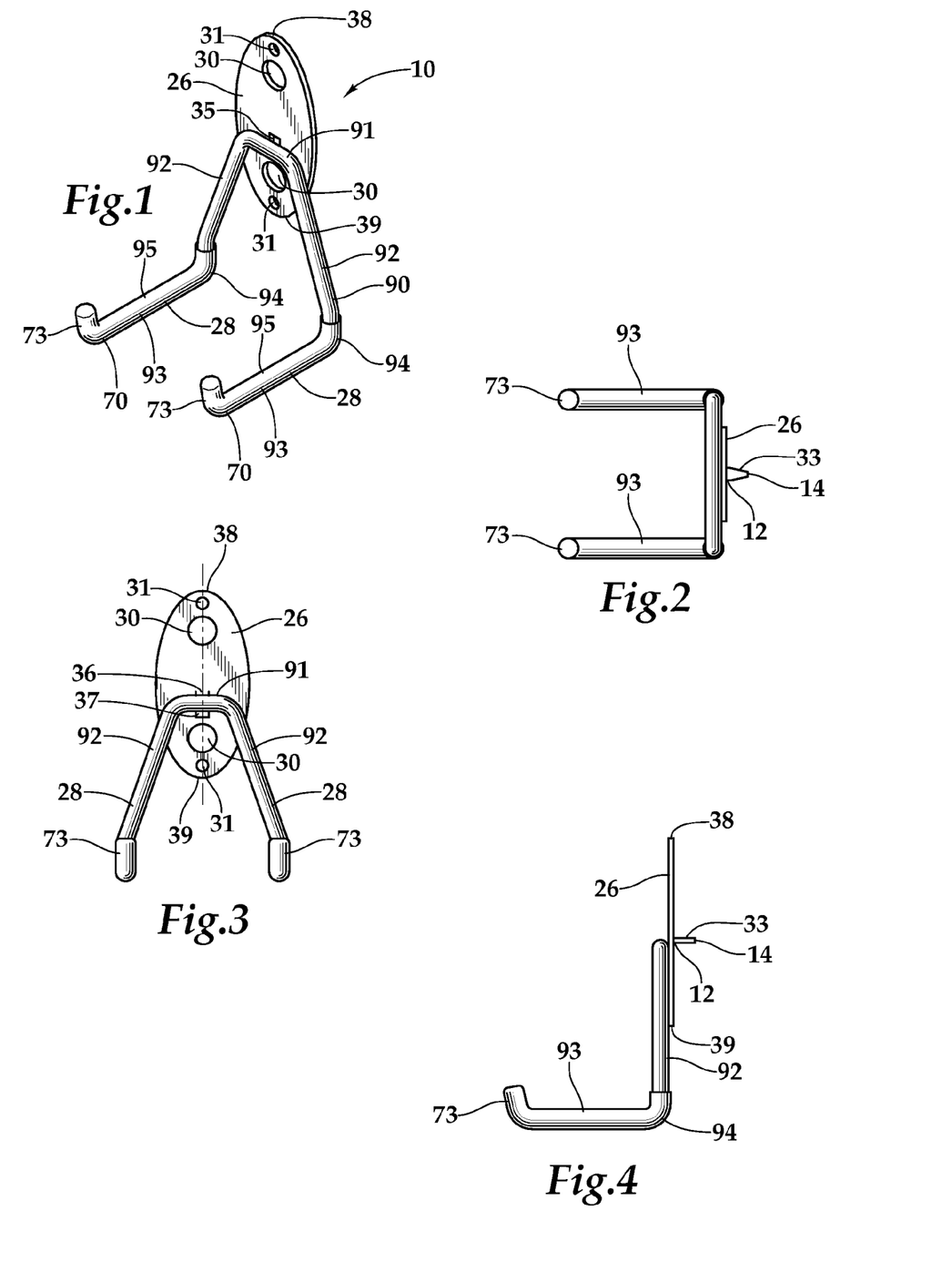
FIG. 1 is a perspective view of a holder mountable to a variety of substrates for holding an object.
FIG. 2 is a top plan view of the holder of FIG. 1.
FIG. 3 is an elevation view of the holder.
FIG. 4 is a side view of the holder.

Fasteners 24 anchor and also rotationally lock holder 10 in place to prevent rotation and loosening of holder 10. Openings 30 may be positioned with at least one opening generally vertically above center and above leg(s) 28 and at least one opening generally vertically below center and below leg(s) 28, as shown in FIG. 1, so that the pullout strength acts to prevent holder 10 from pivoting outwardly away from drywall. Installing holder 10 with at least one drywall fastener 24 positioned above center with drywall fastener threads 32 engaged in drywall increases the shear load holder 10 can withstand. Two openings 30 for receiving drywall fasteners are included in base plate 26, as shown in FIG. 1. In addition, base plate 26 may have two secondary openings 31 for receiving fasteners that enable base plate 26 to be mounted to a variety of surfaces.

The base plate 24 also may have a rearwardly projecting tang 33, which may puncture the paper surface of the drywall and extend a short distance into the drywall to pre-position the holder on the drywall surface for fastener insertion, and, upon installation, to further enhance the shear load capacity of the installed holder. Tang 33 may be triangularly shaped and may be between about ⅛ inch and about ½ inch long, preferably between about ¼ inch and about ½ inch long, and in one embodiment, about 0.35 inch long. Tang may also be between about 0 inches and about ¼ inch wide, preferably about ⅛ inch wide. Base plate 24 may be stamped to form a generally rectangular opening 35. Material removed in making generally rectangular opening may not be completely separated from base plate, and tang 33 may be formed from removed material. Tang 33 may be formed at an upper end 36 of opening or at a lower end 37.

Referring to FIGS. 21 and 22, each drywall fastener 24 includes a head 25 having a recess 64, such as the Phillips recess 64 shown in FIG. 21, for receiving a rotary driver (not shown) so that holder 10 may be installed with a driving tool, such as a screwdriver or a drill with a screwdriver bit. Recess 64 includes one or more torque transmitting surfaces 65 so that torque may be transmitted from the rotary driver to rotate drywall fastener 24 in order to drive drywall fastener 24 through the drywall.

Returning to FIGS. 1-4, holder 10 may further comprise a generally symmetrical wireform 90 having a pair of legs 28 with a portion 91 therebetween. Wireform 90 may be welded to base 26 wherever wireform contacts base 26. Preferably, portion has a welded length between about ½ inch and about 1½ to secure wireform 90 to base 26. Each leg may have a first segment 92 extending generally parallel to the base 26 and a second segment 93 extending outwardly of the base 26.

One or more legs 28 extend from base plate 26, providing a place to hang an object. Legs 28 may come in many configurations, including straight legs, J-shaped legs, C-shaped legs, bicycle hooks, ladder hooks, tool hooks, coat or hat hooks, or a U-shaped pair of legs 28. Each leg 28 may extend axially out from base plate 26, but, preferably, legs 28 may extend laterally along an outer surface of the drywall before extending away from base plate 26.

Continuing with FIGS. 1-4, in one embodiment, a pair of legs 28 forms a U-shape when viewed from above. A U-shaped holder 10 may be particularly useful for holding long handled objects, such as a spade or broom, so that the handle fits between legs 28 and the spade blade or the broom head rests on legs 28. Legs 28 are diametrically opposed, symmetrical about an axis 18, and may extend downward and along wall before bending to form a distal portion 70 that extends substantially perpendicular to base plate 26 so that legs 28 may be positioned so they are level and parallel with the floor. Legs 28 may form an angle between about 0 degrees and about 45 degrees with respect to a centerline of base plate 26, preferably between about 10 degrees and about 35 degrees, still more preferably between about 15 degrees and about 25 degrees and in the embodiment shown in FIGS. 1-4, about 20 degrees. Each leg 28 may have an enlarged foot 72 or an upturned end 73 at distal portion 70, at a distal end of leg 28 to prevent the object from sliding off or tipping over the end of legs 28. Upturned end may have a height between about ¼ inch and about 1 inch, preferably between about ½ inch and about ¾ inch and, in one embodiment, about ⅝ inch.

It may be desirable that the spacing LS between legs 28 be large enough so that a typical handle of a broom or spade, i.e. a cylindrical handle having a diameter of between about 1 inch and about 1½ inches, will fit between legs 28. An inner edge of each foot 72 or upturned end 73 may protrude inwardly toward the other leg 28 so that the spacing FS between feet 72 may be smaller than spacing LS between legs 28. Upturned end 73 may alternatively protrude generally vertically so that FS and LS are substantially equivalent. The foot may also extend upwardly from leg 28 to provide a stop to prevent a tool, such as a spade, from sliding between feet 72. Upturned end 72 may be angled between about 70 degrees and about 130 degrees with respect to distal portion 70, preferably between about 90 degrees and about 110 degrees, still more preferably about 100 degrees. Legs 28 and upturned end 73 may also be coated with a durable plastic material such as plastisol.

The spacing FS and LS between feet 72 and legs 28 may be large enough, and base plate 26 is long enough so that the nose of a drill will fit between feet 72 and legs 28 so that a user may use a typical cordless drill adapted with a screwdriver bit to engage recess 64 and rotate each drywall fastener 24 to drive each drywall fastener 24 through a hole 30 into the drywall.

In one embodiment, such as the one shown in FIGS. 1-4, the spacing LS between the pair of legs 28 may be between about 1½ inches and about 3 inches, preferably between about 2 inches and about 2½ inches, still more preferably about 2.2 inches.

Each side of distal portion 70 of each leg 28 may include upper and lower flat surfaces 78 which may be generally parallel to the common plane of legs 28 so that when legs 28 are level, an object laid across flat surfaces 78 will also be level. Legs 28 may also include one or more grooves 80 (not shown) formed in each leg 28 so that an object may rest within the grooves 80. For example, an object having a thin portion that will be laying on legs 28, i.e. the blade of a shovel or spade, may be hung off legs 28 so that the thin portion rests in grooves 80 to prevent the spade from rolling or sliding along legs 28.

Legs 28 and upturned ends 73 may be symmetrical, as best shown in FIGS. 1 and 3. In addition, in FIGS. 1 and 3, when legs 28 are positioned so that they are level, openings 30 may be positioned so that they are generally centered vertically on axis 18. Legs 28 may extend in a plane generally parallel to mounting surface and may also angle away from axis 6. Angled first segment 92 of legs 28 may be between about 1 inch and about 4 inches long, preferably between about 2 inches and about 3 inches long, more preferably between about 2¼ inch and about 2¾ inch long, and in one embodiment, about 2.4 inches long.

Legs 28 may bend from angled first segments 92 to extending second segments 93 that may be generally perpendicular to mounting surface. Second segments 93 may spaced vertically from center of upper opening 30 by between about 2 inches and about 5 inches, preferably between about 2½ inches and about 4½ inches, still more preferably between about 3 inches and about 4 inches, and in one embodiment, about 3¾ inches. Second segments 93 may have a length from first segments 92 to upturned ends 73 between about 1 inch and about 8 inches, preferably between about 2 inches and about 5 inches, and in one embodiment, about 2¼ inches.

As seen in FIGS. 1-4, legs 28 may be made of a strong material that is workable enough to bend into the desired configuration, but resilient enough to resist deformation upon loading. Preferably, legs 28 are made of wireform having a diameter of between about ⅛ inch and about ½ inch, preferably between about ⅛ inch and ⅜ inch, still more preferably about ¼ inch. Wireform may be metal, preferably cold-rolled steel such as 1010 or 1020 steel.

Holder 10 may not be a unitary structure, but may comprise base plate 26 and leg(s) 28 operatively connected to base plate 26. Connection should be strong enough to keep legs 28 affixed to base plate 26 under loading conditions. Connection may comprise a fastener through legs 28 and base plate. Connection may also comprise forming a recess on a rear surface of base and locating legs 28 between mounting surface and base when installing. Preferably, connection is a weld. Several types of welds may be used, including spot welds. More preferably, however, connection is a fillet weld. Fillet weld may be between about ⅙ inch and about ⅜ inch, preferably about ⅛ inch. In addition, fillet weld may extend substantially around a perimeter defining the contact between base plate 26 and legs 28.

As seen in FIG. 1-4, legs 28 may be operatively connected to base plate 26 below center of base plate 26. Legs 28 may also cover generally rectangular opening 35 from which tang 33 was stamped. Top of legs may be between about 1 inch and about 2 inches from top of base plate 26, preferably between about ¼ inch and about 1¾ inch, and in one embodiment, about 1⅝ inch.

Referring to FIGS. 21 and 22, in one embodiment, self-drilling drywall fastener 24 has an enlarged head 25, an axis 27, a drilling portion 34 having a length longer than a thickness of the friable substrate or drywall and a high-threaded proximal portion 32 for engaging friable substrate or drywall. The threads 32 are sized to pass freely through the openings 30 in the base plate 26, while the head 25 engages the base plate 26 around the openings 30. The base plate 26 is substantially wider than a largest outside diameter of proximal portion 32.

Drywall fastener 24 may have a long unthreaded drilling portion 34 of the type sold under the trademark STUD SOLVER, see commonly assigned U.S. patent application Ser. No. 11/850,70,311 to Ernst, et al., the contents of which is incorporated herein by reference. Fastener 24 may be a self-drilling drywall fastener capable of penetrating studs, but preferably has the configuration shown in FIGS. 21 and 22. Because drywall fastener 24 is not an anchor and does not receive a fastener, drywall fastener 24 may be solid rather than hollow, allowing drywall fastener 24 to have a smaller root diameter while still providing the durability necessary to be driven into drywall and any stud which may be behind the drywall.

Second fasteners 23 may be smaller fasteners for installing holder 10 against a variety of substrates. Second fasteners 23 may have a crest diameter between about ⅛ inch and about ¼ inch, preferably about 3/16 inch. In one embodiment, second fasteners may be masonry fasteners of the type sold under the trademark TAPCON, see commonly assigned U.S. Pat. No. 6,296,433 to Forsell, et al., the contents of which is also incorporated herein by reference.

In another embodiment, FIGS. 5 through 8 show a long U hook, which is a similar holder 110 having similar base plate 126 and legs 128 that may extend a greater distance both down and outward from base plate 126 and further away from mounting surface.

In this embodiment, first segment 192 of legs 126 may form an angle of between about 5 degrees and about 25 degrees with respect to a centerline of base plate 26, preferably between about 5 degrees and about 20 degrees, more preferably about 15 degrees, and in one embodiment about 14 degrees. First segment 192 may have a length along mounting surface of between about 2 inches and about 4 inches, preferably between about 2½ inches and about 3½ inches, more preferably about between about 2¾ inches and about 3¼ inch, and in one embodiment about 3⅛ inches. In addition, second segments 193 may be located between about 3 inches and about 6 inches, preferably between about 4 inches and about 5 inches, more preferably between about 4½ inches from center of upper opening 130. Moreover, second segments 193 may have a length between about 2 inches and about 6 inches, preferably between about 3½ inches and about 5 inches, still more preferably between about 4½ inches and about 5 inches, and in one embodiment about 4.8 inches.

Upturned end 173 may be similar to that of the embodiment shown in FIGS. 1-4. However, as longer legs 126 may be used to support larger objects, upturned end 173 may be larger than that of the embodiment of FIGS. 1-4 to inhibit larger objects from sliding off or otherwise being inadvertently dislodged from legs 126. Upturned ends 173 may be between about ¼ inch and about 1½ inches, preferably between about ½ inch and about 1 inch, more preferably between about ⅝ inch and about ⅞ inch, and in one embodiment, about 11/16 inch.

In another embodiment, FIGS. 9 through 12 show an even longer U hook, which is a similar holder 210 having similar base plate 226 and legs 228 that may extend a greater distance both down and outward from base plate 226 and further away from mounting surface. Longer hook 210 may be referred to as a ladder hook because it may be sized to support steps or support(s) of a ladder for storage against a mounting surface.

In this embodiment, first segment 292 of legs 226 may form an angle of between about 3 degrees and about 15 degrees with respect to a centerline of base plate 26, preferably between about 5 degrees and about 10 degrees, more preferably about 7 degrees. First segment 292 may have a vertical distance of between about 3 inches and about 10 inches, preferably between about 4 inches and about 7 inches, more preferably about 5 inches from top of legs 226 to second segments 293. In addition, second segments 293 may be located between about 3½ inch and about 11½ inch, preferably between about 4½ inch and about 9 inches, more preferably between about 5 inches and about 6 inches, and in one embodiment about 5¾ inch from center of upper opening 230. Moreover, second segments 293 may have a length between about 4 inches and about 10 inches, preferably between about 6 inches and about 8 inches, still more preferably about 7 inches, and in one embodiment about 7⅛ inches.

Because legs 226 extend downward further than legs 26 of the embodiment of FIGS. 1-4, legs 226 may be spaced closer together while still enabling a drill having a driving attachment such as a Phillips driver to be used to install fasteners and/or secondary fasteners 24, 23. Legs 226 may be between about 1 inch and about 4 inches apart at a distal portion 270, preferably between about 1 inch and about 3 inches apart, still more preferably between about 1 inch and about 2 inches apart, and in one embodiment, about 1¾ inch. Moreover, as longer legs 226 may be used to support larger objects, upturned end 273 may be larger than that of the embodiment of FIGS. 1-4 to inhibit larger objects from sliding off or otherwise being inadvertently dislodged from legs 226. Upturned ends 273 may be between about ½ inch and about 2 inches, preferably between about ¾ inch and about 1½ inch, and in one embodiment, about 1⅛ inch.

FIGS. 13 through 16 show a similar holder 310, which, instead of a pair of legs 28 having generally flat surfaces 78 is provided with a pair of J hooks 328. The base plate 326 of the holder 310 is a similar flat, oval or surfboard-shaped element and is manufactured in a similar fashion as base plate 26. The base plate 326 may have a pair of through openings 330 for receiving drywall fasteners 24, a pair of second openings 331 and a tang 333 substantially identical to the openings 30, second openings 31 and tang 33 described above.

Figures 10, 11, 12:
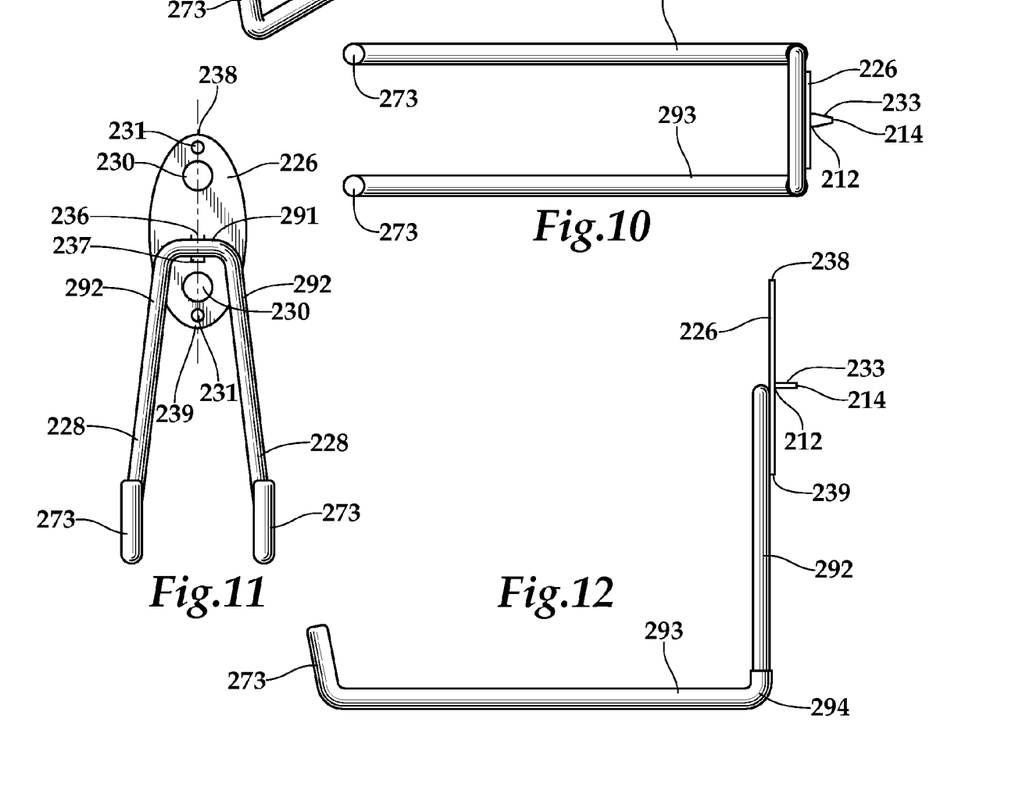
FIG. 10 is a top plan view of the holder of FIG. 9.
FIG. 11 is an elevation view of the holder.
FIG. 12 is a side view of the holder.
Figure 13:
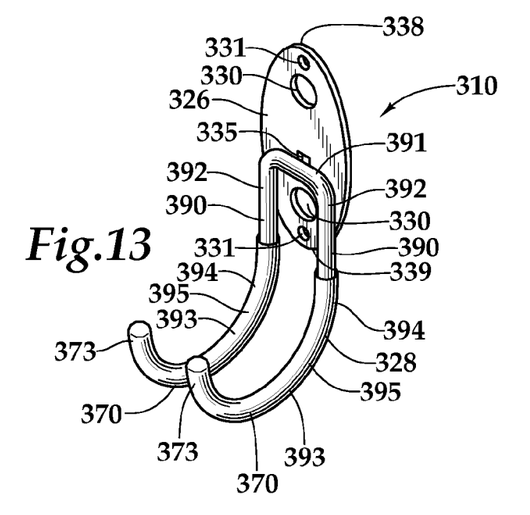
FIG. 13 is a perspective view of another embodiment of a holder mountable to a variety of substrates for holding an object.
Figure 14:
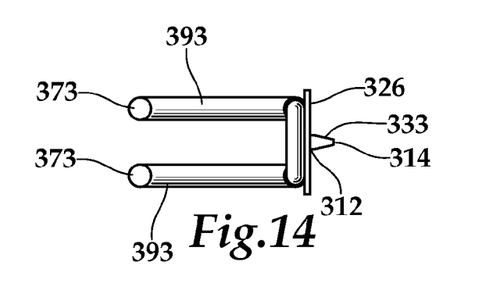
FIG. 14 is a top plan view of the holder of FIG. 13.
Figure 15:
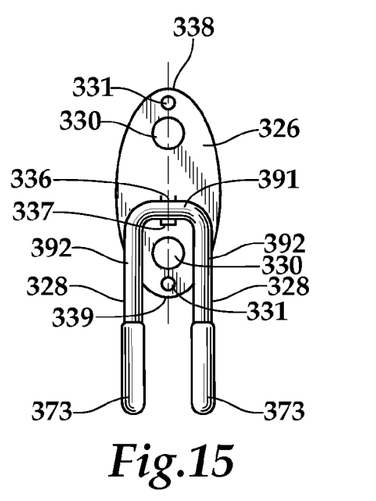
FIG. 15 is an elevation view of the holder.
Figure 16:
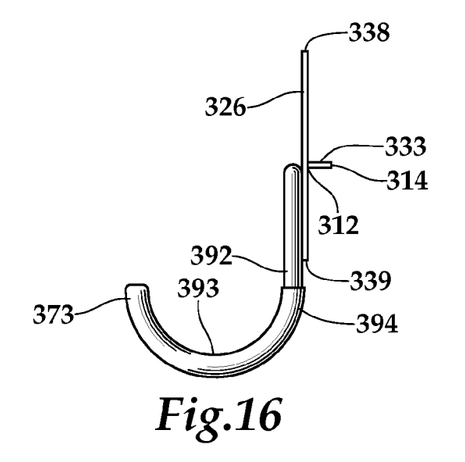
FIG. 16 is a side view of the holder.
Figure 17:
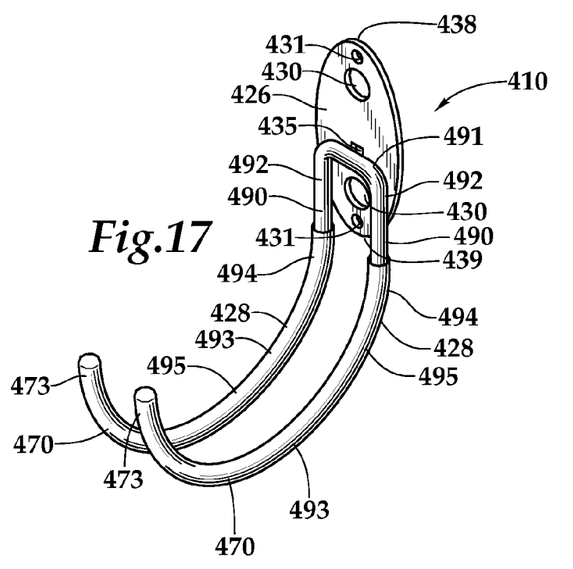
FIG. 17 is a perspective view of another embodiment of a holder mountable to a variety of substrates for holding an object.
Figures 18, 19, 20:
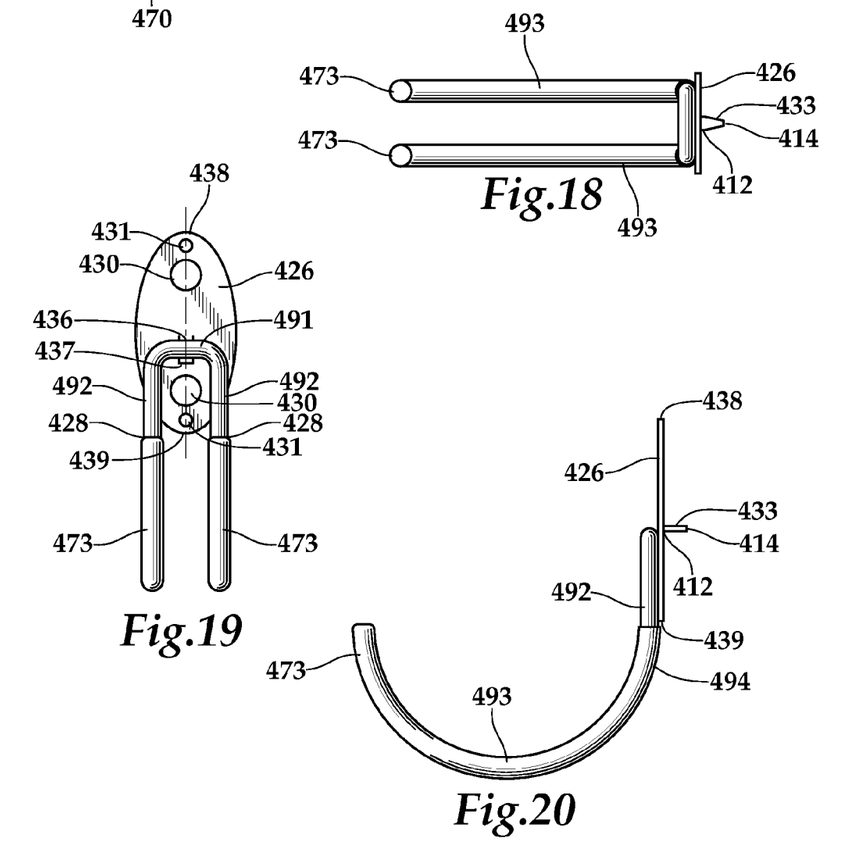
FIG. 18 is a top plan view of the holder of FIG. 17.
FIG. 19 is an elevation view of the holder.
FIG. 20 is a side view of the holder.

The J hook holder 310 may include a single, and generally J shaped leg 328. Preferably, however, holder 310 has a plurality of J shaped legs 328. As seen in FIG. 12, legs 328 may extend substantially vertically downward along base plate 326, transitioning to a second segment 393. Second segment 393 may begin at a location spaced from top of legs a predetermined distance of between about 1 inch and about 3 inches, preferably between about 1 inch and about 2 inches, more preferably between about 1½ inch and about 2 inches, and in one embodiment, about 1¾ inch. Second segment 392 may also begin at a predetermined position spaced downward from bottom of base plate 326 by between about 0 inches and about 2 inches, preferably between about 0 inches and about 1 inch, still more preferably between about 0 inches and ½ inch, and in one embodiment, about 0.2 inch. Moreover, second segment 393 may have an upper surface 396 upon which object may be rested. At its lowest position 397, upper surface 396 may be spaced between about 2 inches and about 6 inches from center of uppermost opening 330, preferably between about 3 inches and about 4 inches, still more preferably about 3¾ inch.

Second segment 393 of legs 328 may be substantially circular, ovoid or otherwise curved. In the embodiment shown in FIGS. 13-16, second segment 292 is substantially semi-circular, such that beginning proximate bend 394 and distal portion 370 of second segment 393 are spaced vertically substantially the same distance from bottom 339 of base plate 326. However, distal portion 370 may extend higher or lower than bend 394.

If second segment 393 is substantially circular, second segment 393 may further have an inner radius of curvature. Radius may be between about ½ inch and about 2 inches, preferably between about ¾ inch and about 1½ inch, still more preferably about 1 inch. In addition, if distal portion 270 extends higher than bend 394, distal portion 370 may straighten and point generally vertically upward or otherwise deviate from radius of curvature.

Staying with FIGS. 13-16, because J shaped legs 328 may not extend outward from base 326, legs 328 may be spaced closer together than legs in the embodiments of FIGS. 1-4 and 5-8. Legs 328 may be substantially symmetrical about centerline of base 326 and may be between about ¼ inch and about 2 inches at their narrowest, preferably between about ½ inch and about 1¼ inch, still more preferably between about ¾ inch and about 1 inch, and in one embodiment about ¾ inch.

In the same fashion as the U-hook type holder 10 described above, the legs or hook portions 328 of the J hook type holder 310 may be coated with a durable plastic material 395 and may be operatively engaged to base plate 326, for example, by welding legs 328 to base plate 326.

Referring to FIGS. 17 through 20, a second embodiment of a J-hook type holder is shown, and designated generally by reference numeral 410. The J hook 410 is generally configured similarly to the J hook type holder 310 described above, whereby like reference numerals with the prefix 4 are utilized to designate the like parts and components. The legs or hook portions 428 of the J hook type holder 410 are, however, longer than legs 328. Legs 428 may have an inner radius of curvature between about 1 inch and about 4 inches, preferably between about 1½ inch and about 3 inches, still more preferably about 2 inches. Legs 428 may extend outward from base between about 2½ inches and about 8 inches, preferably between about 3½ inches and about 6 inches, still more preferably between about 4 inches and about 5 inches, and in one embodiment about 4½ inches.

As legs 428 are longer than legs 328, second segments 493 may also begin nearer top portion 491 of legs 428 than legs 328. Bend 494 may be between about 1 inch and about 2 inches from portion 491, preferably between about 1¼ inch and about 1¾ inch, still more preferably about 1½ inch.

While legs 428 may be longer than legs 328 shown in FIGS. 9-12, legs 428 may be similarly spaced. In one embodiment, legs 428 may be spaced about ¾ inch apart at their narrowest.

Holders of the form in any of the embodiments described above may have a holding strength between about 50 lbs. and about 100 lbs. when installed in drywall using drywall fasteners as described below, which may be similar to holding strength of molded zinc holders using similar drywall fasteners. However, holders of the form described in the embodiments above may cost significantly less than molded zinc holders, i.e., between about ½ and about ⅔ a cost of molded holders. Holders of the form described in the embodiments above may also be easier to manufacture, relying on dies and eliminating the need for manufacturing and replacing molds. As such, holders may be referred to as economy hooks.

Drywall Fastener

In one embodiment, shown in FIGS. 21 and 22, self-drilling drywall fastener 24 has an axis 27, a screw-like drilling portion 34 longer than the thickness of drywall, a high-threaded drywall engaging proximal portion 32 and a head 25 having a tool receiving recess 64 for receiving a rotary driver.

Continuing with FIGS. 21 and 22, in one embodiment, self-drilling drywall fastener 24 includes a high-threaded proximal portion 32 having threading 20 with a crest diameter and a high thread height for engaging drywall, and threaded drilling portion 34 longer than a thickness of drywall and threading 50 with a crest diameter substantially smaller than the crest diameter of proximal portion 32 and a thread height substantially smaller than the thread height of proximal portion 32.

The crest diameter of threading 20 of proximal portion 32 may be about twice the root diameter of threading 50. In one embodiment, the crest diameter of threading 20 may be between about ¼ inch and about ¾ inch, for example about ½ inch, the root diameter at proximal portion 32 may be between about ⅛ inch and about ⅜ inch, and the thread height of threading 50 may be between about ⅛ inch and about ⅝ inch, for example about ¼ inch. The high-threaded proximal portion 32 may be slightly longer than drywall thickness so that high threading 20 is able to engage the paper on an inner drywall surface to add further to the pullout resistance and load capacity of holder 10 as well as to accommodate the seating of the head 25 on the base plate 26 around the hole 30.

In one embodiment, drywall gripping threading 20 may be one continuous generally helical thread and the root of proximal portion 32 expands tapers from drilling portion 34 toward proximal end so that drywall fastener 24 has enough strength to be driven into wood.

Figures 5, 6, 7, 8:
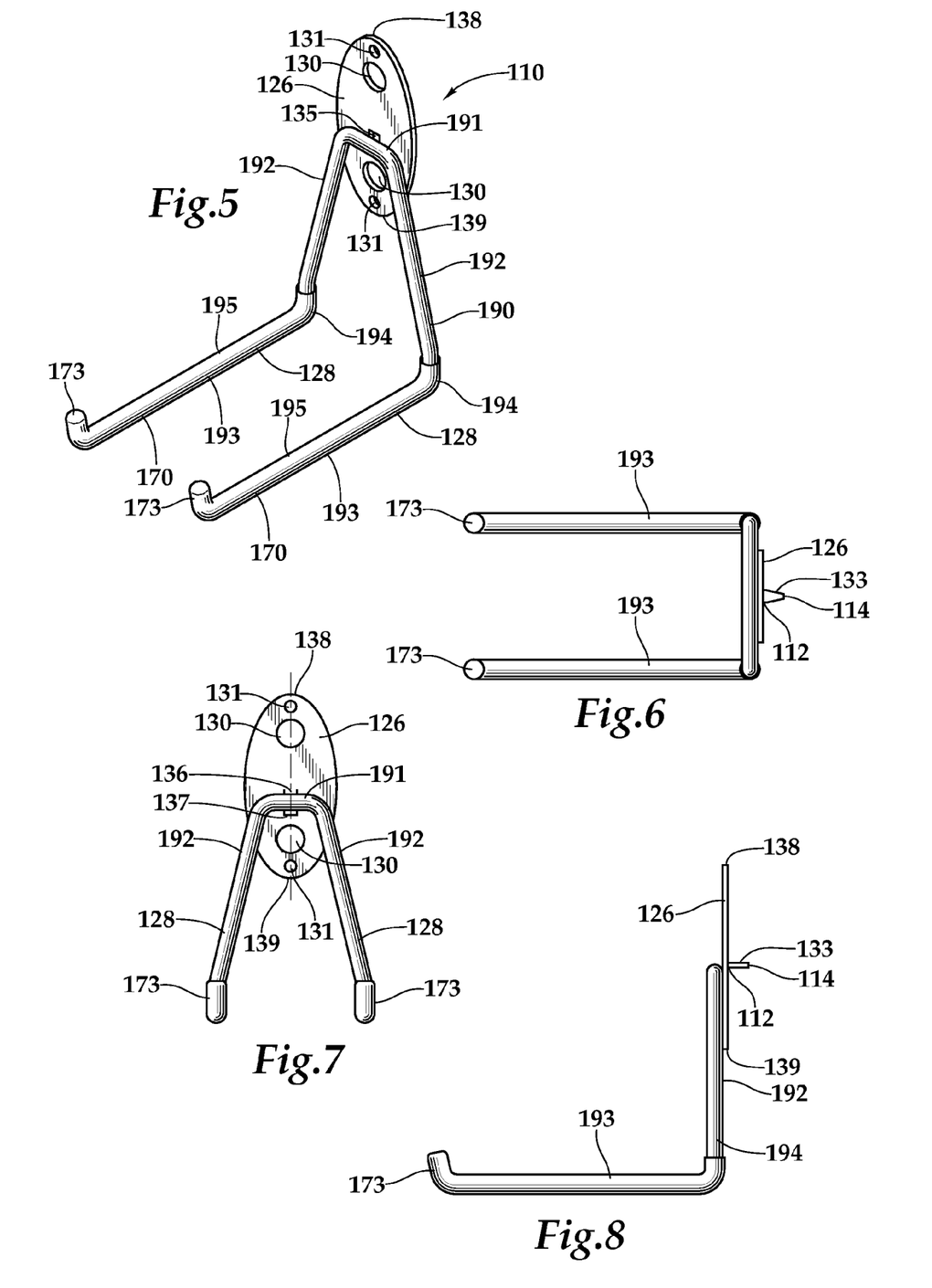
FIG. 5 is a perspective view of another embodiment of a holder mountable to a variety of substrates for holding an object.
FIG. 6 is a top plan view of the holder of FIG. 5.
FIG. 7 is an elevation view of the holder.
FIG. 8 is a side view of the holder.
Figure 9:
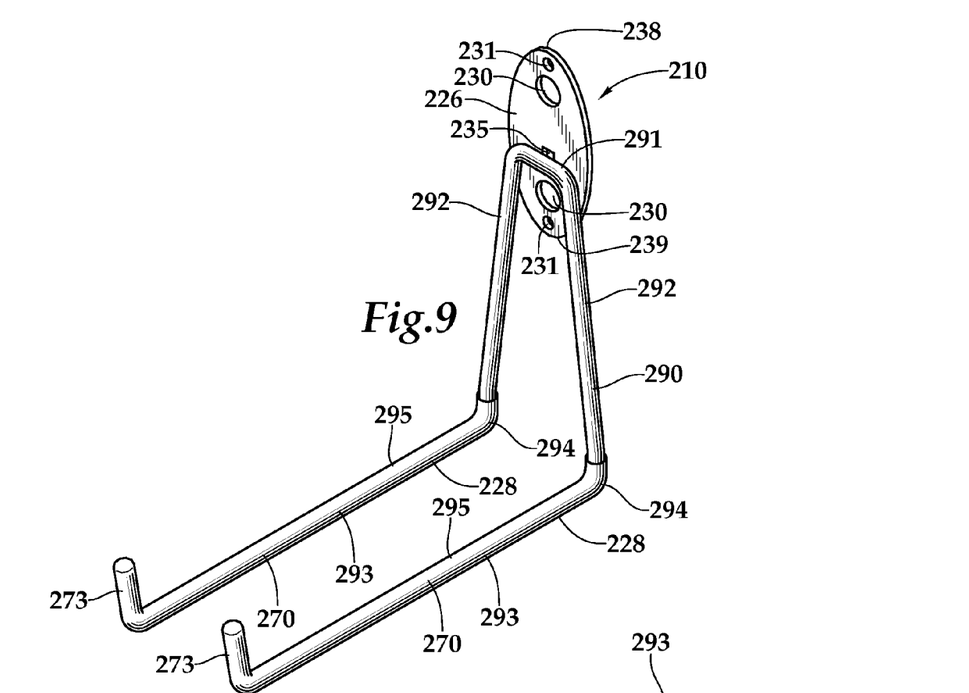
FIG. 9 is a perspective view of another embodiment of a holder mountable to a variety of substrates for holding an object.

The screw-like drilling portion 34 with a length longer than drywall thickness allows drywall fastener 24 to bore a hole entirely through the drywall before high threading 20 on proximal portion 32 begins to engage the drywall. The screw-like smaller threading 50 of drilling portion 34 also allows drywall fastener 24 to be able to grip and drill into a stud if a user encounters a stud while installing holder 10 because the substantially smaller thread height and crest diameter of drilling portion 34 may be driven into a stud without excessive torque. In one embodiment, the crest diameter of threading 50 of drilling portion 34 is between about 1/16 inch and about 1/4 inch, e.g., about 1/8 inch, and the thread height of threading 50 is between about 0.02 inch and about 0.07 inch, e.g., about 0.035 inch Threading 50 may include a generally helical thread, as shown in FIG. 5, which may continue as thread 20 on proximal portion 32 so that there may be a continuous thread between drilling portion 34 and proximal portion 32. In one embodiment, drilling portion 34 may includes two generally helical threads arranged in a double helix to provide added support around drilling portion 34, to provide faster engagement of drywall fastener 24 with a stud, and to provide balanced driving into stud. The second thread of the double helix may be present for only a portion of drilling portion 34 proximate drilling end 24, or it may continue substantially through all of drilling portion 34 to provide improved grip with a stud.

Drywall fastener 24 may include a drill tip 46 at drilling end 24. In one embodiment, shown in FIG. 22, drill tip 46 is generally conical in shape and coaxial with axis 27 so that drill tip 46 comes to point at axis 27 to guide and quickly engage outer drywall surface 44 and the surface of a stud. In one embodiment, drilling portion 34 may include at least one wing 60, and as shown, a pair of wings 60, that protrudes radially outwardly from drilling portion 34 for reaming out drywall to form a hole having the desired size. Wings 60 are designed to break away when they hit a stud so that wings 60 ream out drywall and not a stud.

Method of Use

Each of the holders 10, 110, 210, 310, 410 may be used by a method including the steps of selecting a location on a wall or ceiling, positioning the holder against the wall or ceiling at the selected position, pressing on said base plate to cause said rearwardly projecting tang to puncture the surface of the drywall and extend a short distance into the drywall, aligning a first drywall fastener 24 with one of the openings, and rotating drywall fastener 24 in a clockwise direction so that drywall fastener 24 drills through the drywall, continuing to rotate drywall fastener 24 until a fastener head engages base plate. The method may also include the step of inserting another fastener 24 into the other opening, and driving the fastener 24 through the drywall until fastener head abuts base plate.

A user may select a position on the wall or ceiling without worrying about the location of a stud located behind drywall because of the configuration of external threading 20 and 50, which allows drywall fastener 24 to drill through drywall and a stud. This feature also allows a user to intentionally position the holder so that drywall fastener 24 does hit stud, because there may be greater hold between drywall fastener 24 and stud, i.e., because the stud or other support member may be less likely to break apart than drywall. The ability to position the holder virtually anywhere along a wall or ceiling allows a user to arrange a plurality of holders on the wall or ceiling for more efficient use of the space allowing a plurality of objects to be held while only needing to install holders using the mounting drywall fasteners 24 with a screwdriver or other rotary driver. The step of rotating drywall fasteners 24 may be accomplished by inserting a rotary driver into recess 64 and driving fasteners 24 with the rotary driver.

The holder of the present invention provides for the use of self-drilling drywall fasteners to increase the overall pullout resistance and load capacity of the holder. In one embodiment, the base plate engages the heads of the fasteners to meter and stop the fasteners so that the fasteners engage the drywall without stripping it out, increasing engagement between the fastener threads and the drywall. The holder also allows a user to hold an object at virtually any position on a surface of a wall or ceiling, even at a location where a support member may be behind the drywall.

In addition, the holder may be placed against a variety of surfaces such as wood studs or concrete/masonry walls and fasteners may be inserted through primary and/or secondary holes to mount holder in place.

Method of Making

A holder of the type described above, and comprising a base plate having at least one opening to receive an anchor, and at least one leg extending from said base plate for holding an object may be made by a method comprising the following steps. Stamping, cutting or otherwise forming base plate from a single piece of material such as sheet metal. Stamping, cutting or otherwise forming first holes, secondary holes and/or tang in base. Forming a rigid, yet non-brittle material such as wireform into a leg or pair of legs by bending wireform into a predetermined configuration. Mounting legs to base plate, preferably by welding legs to base plate, more preferably by fillet welding legs to base plate.

Fasteners may be made by providing a pair of molds having complementary mating cavities, together defining the fastener, feeding molten material into said cavity; setting said molten material to form said fastener; and removing said fastener from said mold.

Heat Treated or Hardened Tang Embodiment

In another embodiment, holder 10 may be configured for mounting to either a friable substrate such as drywall or a non-friable substrate such as concrete, cement or cinder block. In friable substrate applications, tang 33 may penetrate and embed itself in the substrate to position and orient holder 10 prior to and during installation of fasteners 23, 24. In nonfriable substrate applications, a user may not be able to embed tang 33 in the substrate, which may prevent flush mounting of base plate 26 against substrate, hindering installation and/or decreasing effectiveness of holder 10.

To alleviate this problem, tang 33 may be heat treated to harden and/or make it more brittle, which may enable a user to remove tang 33 easily, leaving a generally flat rear surface to base plate 26. For example, tang 33 may be struck with a standard hammer, such as a ball peen or claw hammer, detaching tang 33 from base plate 26.

In order to detach only tang 33 and not damage the rest of base plate 26, it may be desirable to provide a localized heat treatment substantially limited to the area of tang 33 and, preferably, to portion 12 proximate base plate 26 to facilitate separation as close to intersection of tang 33 and base plate 26 as possible. While attempting to make holder 10, some effort was made to close opening 35 in base plate 26 that was created by the formation of tang 33. In one attempt, a welding torch was used to heat and deform base plate 26 in the area surrounding opening 35. As a result, it surprisingly was found that tang 33 protruding from base plate 26 was hardened, providing the ability to separate tang 33 from base plate 26 with a relatively simple impact force.

Since base plate 26 and tang 33 may be made of a relatively low carbon steel such as 1010, hardening may be accomplished by heating to austenitize the steel. This may be followed by quenching into a liquid such as water, oil or brine or with forced air cooling, which may result in martensite transformation of the steel, rendering the tang 33 harder and more brittle. This same process may be used if tang is made of another type of low carbon steels, such as 1018, 1020 or 1022.

One possible heat treatment may rely on heat from a welding torch being applied to tang 33 from tip 14 to portion 12 and to a portion of base plate 26. In addition to heating tang 33, this treatment may shrink or close opening 35, which may provide an enhanced aesthetic appearance of holder 10. Alternatively, localized heat treatment may be applied to tang 33 in the form of induction hardening.

Heat treatments such as this may change the microstructure of base plate 26. For example, in the case of 1010 steel, heat treatment may cause some of the treated steel to transform into a pearlite state.

Tang 33 may be exposed to a temperature between about 1200° F. and about 2000° F., preferably between about 1500° F. and about 1800° F. In addition tang 33 may be exposed to these temperatures for between about 1 second and about 10 seconds, preferably between about 2 seconds and about 8 seconds, still more preferably between about 3 seconds and about 6 seconds. In one example, a welder or an induction hardener may expose tang 33 to temperatures of about 1700° F. for about 5 seconds.

As an alternative to heat treating, tang 33 may also be work hardened. For example, surfaces of tang 33 may be shot peened.

As a result of heat treatments and/or cold working, tang 33 may develop a range of hardnesses along its length, preferably with a maximum hardness observed proximate the intersection of tang 33 and base plate 26. Heat treatment or work hardening may cause tang 33 proximate base plate 26 to have a Rockwell B hardness of between about 70 and about 110, preferably between 80 and about 100, still more preferably between about 90 and 100, and in one embodiment, between about 92 and 97. With this hardness, tang 33 may be separated easily from base plate 26 proximate portion 12, for example by impacting tang 33 with a hammer or by grabbing tang 33 with a pliers and pulling it away from base plate 26. While line of detachment, preferably at portion 12, may not be completely flush with base plate 26, detachment may be sufficiently close to base plate 26 that base plate 26 rests substantially flush against substrate when mounted, particularly when any remaining portion of tang 33 may be compressed against surface 44 of substrate as fasteners 23 are driven through holder 10.

Although heat treatments or work hardening increase hardness of tang 33 and decrease elasticity, holder 10 with hardened tang 33 still may be used successfully in friable substrate applications since the forces experienced by tang 33 during insertion into a friable substrate may be nominal. As such, holder 10 with hardened tang 33 may be well suited and easily configured for various applications.

While the foregoing written description of the invention enables one of ordinary skill to make and use what is considered presently to be the best mode thereof, those of ordinary skill will understand and appreciate the existence of variations, combinations, and equivalents of the specific exemplary embodiment and method herein. The invention should therefore not be limited by the above described embodiment and method, but by all embodiments and methods within the scope and spirit of the invention as claimed.

What is claimed is:

1. A method for hardening a tang protruding from a rear surface of a holder, said holder comprising a thin metal baseplate having a plurality of openings for receiving a plurality of fasteners, said holder further comprising a generally symmetrical pair of legs, said method comprising:
   heating said tang; and
   quenching said tang;
   said method resulting in said tang having a Rockwell B hardness of between about 80 and about 110 proximate said baseplate.

2. A method for hardening a tang according to claim 1, said method comprising:
   forming said tang from the metal of said baseplate.

3. A method for hardening a tang according to claim 2, wherein said baseplate and said tang are made from 1010 steel.

4. A method for hardening a tang according to claim 1, wherein said tang is heated to between about 1500° F. and about 1800° F. for between about 3 seconds and about 6 seconds.

5. A method for hardening a tang according to claim 1, wherein said heating is provided by a welder.

6. A method for hardening a tang according to claim 1, wherein said heating is provided by an induction hardener.

7. A method for hardening a tang according to claim 1, wherein said heating is substantially limited to an area including and proximate said tang.

8. A method for hardening a tang according to claim 1, wherein said tang is quenched in water or oil.

9. A method for hardening a tang according to claim 1, said method resulting in said tang having a Rockwell B hardness of between about 90 and about 100 proximate said baseplate.

* * * * *